United States Patent
Pan

(10) Patent No.: US 10,951,016 B1
(45) Date of Patent: Mar. 16, 2021

(54) VISIBLE LIGHT COMMUNICATION PILOT LIGHT AND INDICATOR LIGHT

(71) Applicant: Appleton Grp LLC, Rosemont, IL (US)

(72) Inventor: Yicheng Peter Pan, Arlington Heights, IL (US)

(73) Assignee: Appleton Grp LLC, Rosemont, IL (US)

(*) Notice: Subject to any disclaimer, the term of this patent is extended or adjusted under 35 U.S.C. 154(b) by 0 days.

(21) Appl. No.: 16/657,738

(22) Filed: Oct. 18, 2019

(51) Int. Cl.
- *H02G 3/08* (2006.01)
- *H01H 9/16* (2006.01)
- *G01N 27/27* (2006.01)

(52) U.S. Cl.
CPC ............ *H02G 3/081* (2013.01); *G01N 27/27* (2013.01); *H01H 9/167* (2013.01)

(58) Field of Classification Search
None
See application file for complete search history.

(56) References Cited

U.S. PATENT DOCUMENTS

| | | | |
|---|---|---|---|
| 2003/0079074 A1* | 4/2003 | Sicola | G06F 3/0601 710/305 |
| 2017/0018213 A1* | 1/2017 | Yang | G09G 3/00 |
| 2018/0240322 A1* | 8/2018 | Potucek | E04H 4/14 |

* cited by examiner

*Primary Examiner* — Adolf Dsouza
(74) *Attorney, Agent, or Firm* — McDonnell Boehnen Hulbert & Berghoff LLP

(57) ABSTRACT

An example system includes an electrical enclosure. The electrical enclosure includes an identification data module, an electrical sensor, an enclosure environment sensor, and a pilot light module. The pilot light module includes (i) a pilot light and (ii) a communication module. The communication module is coupled to the identification data module, the electrical sensor, and the enclosure environment sensor. The communication module is configured to determine a visual communication signal based on information received from one or more of the identification data module, the electrical sensor, and the enclosure environment sensor, and drive the visual communication signal via the pilot light. The visual communication signal indicates one or more operational parameters within the electrical enclosure. The system further includes a client device configured to receive the visual communication from the pilot light.

18 Claims, 4 Drawing Sheets

VISIBLE LIGHT COMMUNICATION PILOT LIGHT AND INDICATOR LIGHT

BACKGROUND OF THE INVENTION

The present disclosure relates to systems and methods for facilitating communication from an electrical enclosure, such as a junction box. A junction box may include or connect to a plurality of electrical components whose performance can be impacted by operational characteristics of the junction box. For example, performance or lifespan of these components can be reduced based on excess heat buildup or moisture within the junction box.

Further, detecting failure of one or more electrical components, such as through use of a pilot light, may not provide information indicative of the cause of the failure. And opening the enclosure, apart from being burdensome, may remove operational conditions that caused the failure, thus making the source of failure difficult to detect. Still further, electrical enclosures may be composed of materials, such as metallic materials, that attenuate wireless communication signals from within the enclosure. Accordingly, designs disclosed herein relate to light-based communication systems and methods that allow for communication of conditions within the enclosure. In addition, particular variations are described that allow for efficient and regular communication from one or more electrical enclosures that facilitates preventative maintenance and targeted repairs.

As such, the present invention fulfills a need by more efficiently and cost-effectively protecting components within electrical enclosures by providing techniques for communicating detected operational parameters from within the enclosures without the need for opening the enclosures themselves.

SUMMARY

In one aspect, a system is described. The system includes an electrical enclosure. The electrical enclosure includes an identification data module, an electrical sensor, and an enclosure environment sensor. The system further includes a pilot light module comprising (i) a pilot light and (ii) a communication module, wherein the communication module is coupled to the identification data module, the electrical sensor, and the enclosure environment sensor. The communication module is configured to determine a visual communication signal based on information received from one or more of the identification data module, the electrical sensor, and the enclosure environment sensor. The communication module is further configured to drive the visual communication signal via the pilot light, wherein the visual communication signal indicates one or more operational parameters within the electrical enclosure. The system further includes a client device configured to receive the visual communication from the pilot light.

In a second aspect a method is described. The method includes detecting one or more operational parameters within an electrical enclosure using one or more of an identification data module, an electrical sensor, and an enclosure environment sensor included in the electrical enclosure. The method further includes receiving, by a pilot light module of the electrical enclosure, information indicative of the one or more operational parameters from one or more of the identification data module, the electrical sensor, and the enclosure environment sensor, wherein the pilot light module comprises (i) a pilot light and (ii) a communication module. The method further includes determining, by the communication module of the pilot light module, a visual communication signal based on the information received from one or more of the identification data module, the electrical sensor, and the enclosure environment sensor. The method further includes driving a visual communication signal via the pilot light of the pilot light module, wherein the visual communication signal indicates the one or more operational parameters within the electrical enclosure.

In a third aspect, a non-transitory computer readable medium having stored thereon instructions is described. The instructions, when executed by one or more processors, perform functions. The functions include detecting one or more operational parameters within an electrical enclosure using one or more of an identification data module, an electrical sensor, and an enclosure environment sensor included in the electrical enclosure. The functions include receiving, by a pilot light module of the electrical enclosure, information indicative of the one or more operational parameters from one or more of the identification data module, the electrical sensor, and the enclosure environment sensor, wherein the pilot light module comprises (i) a pilot light and (ii) a communication module. The functions include determining, by the communication module of the pilot light module, a visual communication signal based on the information received from one or more of the identification data module, the electrical sensor, and the enclosure environment sensor. The functions include driving a visual communication signal via the pilot light of the pilot light module, wherein the visual communication signal indicates the one or more operational parameters within the electrical enclosure.

These, as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Within examples, an electrical enclosure is provided having a plurality of modules and/or sensors configured to detect operational states of the electrical enclosure. For example, the electrical enclosure may house multiple electrical components, and the modules and/or sensors may determine operational states of each of the electrical components, as well as other factors that may influence operation of those components. For example, heat, humidity, and water ingress may affect how these components operate, or weather these components should be powered. For purposes of the forthcoming description, "components" of an electrical disclosure may include sensors, meters, wire splices, electrical breakers, fuses, or other electrical hardware. In some examples, a "component" may serve as an access point to one or more power-consuming or power-generating devices remote from the electrical enclosure. For instance, the electrical enclosure may include an electrical power component of one or more of an electric motor, a compressor, a thermostat, a valve, a regulator, a gearbox, a light fixture, and a pump.

Within further examples, an electrical enclosure may relay operational information to remote devices in order to allow for assessment of the enclosure, any components therein, or to facilitate manual intervention. In particular, this can involve using visible light to convey information to remote devices. This may allow for effective communication of operational parameters without the electrical enclosure being opened. Conveying this information may be carried out differently depending on an operational context of the electrical enclosure, or based on an operating mode of the enclosure. This may facilitate targeted information being conveyed that is of more value in a given context or mode.

Within other examples, a system may include a plurality of electrical enclosures that operate within a common environment. In such examples, the various enclosures may operate in a coordinated manner to facilitate quick evaluation of each enclosure in the common environment.

Figure 1:
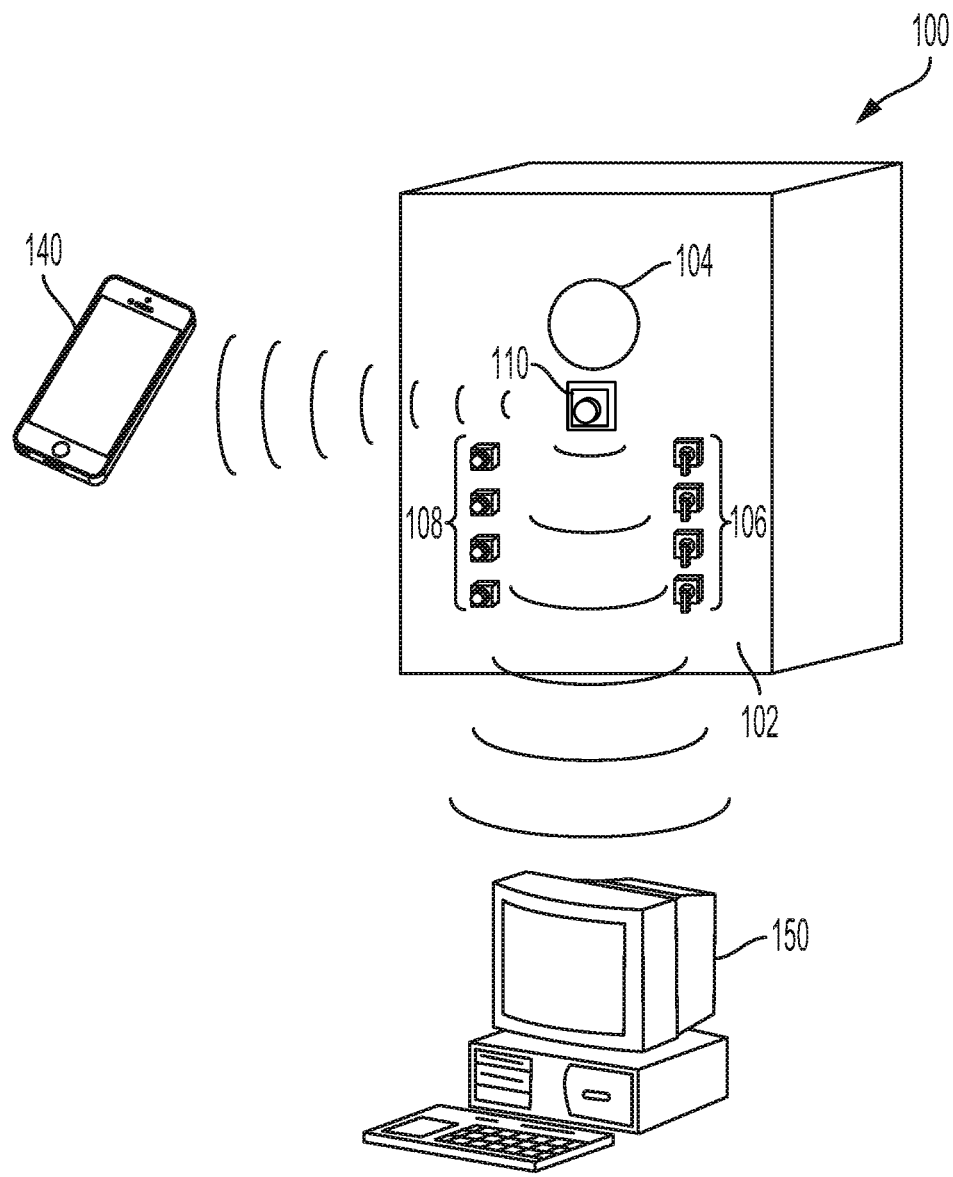
FIG. 1 depicts a system including an electrical enclosure, according to an example implementation.

Turning now to the figures, FIG. 1 depicts a system including an electrical enclosure 100, according to an example implementation. The system further includes a client device 140 (depicted as a mobile device) and a controller 150 (depicted as a computing device). The electrical enclosure is depicted as a junction box, and includes a housing 102, a window 104, a plurality of control switches 106, a plurality of ON/OFF indicator lights 108, and a pilot light 110. Though not depicted in FIG. 1, the electrical enclosure 100 may further include an identification data module for providing identification data of the electrical enclosure 100 and/or components thereof, an electrical sensor for detecting voltage, current, or other operational aspects of the electrical enclosure and/or components thereof, and an enclosure environment sensor for determining other operational aspects of the electrical enclosure, as described further below. The pilot light 110 may be controlled by a communication module that drives a Visible Light Communication (VLC) signal, or another type of modulated visible communication signal.

The client device 140 may be configured to receive the visible communication signal and to thereby determine, for example, an identification number of the electrical enclosure, operational aspects of one or more components within the electrical enclosure 110, or an operational characteristic within the electrical enclosure 100. These may be, in turn, communicated to the controller 150 or to a remote memory, such as a database containing operational information of the electrical enclosure 100 and other electrical enclosures in a common environment of the electrical enclosure 100.

The control switches 106 are switches attached to an outer portion of the electrical enclosure 100. Each of the switches controls a different electrical component within the electrical enclosure 100. The client device 140 may determine a manual action for performance based on the received signal. For instance, the client device 140 may determine that one or more components of the electrical enclosure 100 should be switched to an OFF position based on receiving the signal, and may provide a visual indication to manually carry out this action using a user interface of the client device. This can involve, for example, providing a representation of the electrical enclosure 110 on a screen and highlighting which of the control switches 106 should be switched to an OFF position, of the client device 140. Further examples of such interactions between electrical enclosures and client devices are provided below.

The client device 140 may include one or more processors, a memory, and instructions. The one or more processors may be general-purpose processors or special purpose processors corresponding to processing visual communication signals. The one or more processors can be configured to execute the instructions (e.g., computer-readable program instructions) that are stored in the memory and are executable to provide the functionality of the client device 140 or systems thereof.

The memory includes computer-readable storage media that is accessible and executable by the one or more processors. The memory can include volatile and/or non-volatile storage components, such as optical, magnetic, organic or other memory or disc storage, which can be integrated in whole or in part with the processors. The memory is considered non-transitory computer readable media. Instructions executable by the one or more processor are stored on the memory. The instructions include computer-executable code.

The controller 150 may be a remote computing device that is communicatively coupled to the electrical enclosure 100, and may be configured to control aspects of operating the electrical enclosure 100. For example, as described in further detail below, the controller 150 may control the electrical enclosure 100 to drive a particular type of visual communication signal indicative of particular operational parameters, such as an operational state of a particular component within the electrical enclosure 100. Though the controller 150 is depicted as receiving visual communication signals from the pilot light 110, the controller 150 may communicate with the electrical enclosure 100 using a wired or non-visual wireless connection, such as a WiFi connection to a wireless interface (not depicted for purposes of simplicity) of the electrical enclosure 100.

The controller 150 may include one or more processors, a memory, and instructions. The one or more processors may be general-purpose processors or special purpose processors corresponding to controlling one or more electrical enclosures. For example, the one or more processors may be configured for Controller Area Network (CAN) communications or other communication schemes suited for coordinating tasks in a common environment. The one or more processors can be configured to execute the instructions (e.g., computer-readable program instructions) that are stored in the memory and are executable to provide the functionality of the controller 150 or systems thereof.

The memory includes computer-readable storage media that is accessible and executable by the one or more processors. The memory can include volatile and/or non-volatile storage components, such as optical, magnetic, organic or other memory or disc storage, which can be integrated in whole or in part with the processors. The memory is considered non-transitory computer readable media. Instructions executable by the one or more processor are stored on the memory. The instructions include computer-executable code.

Figure 2:
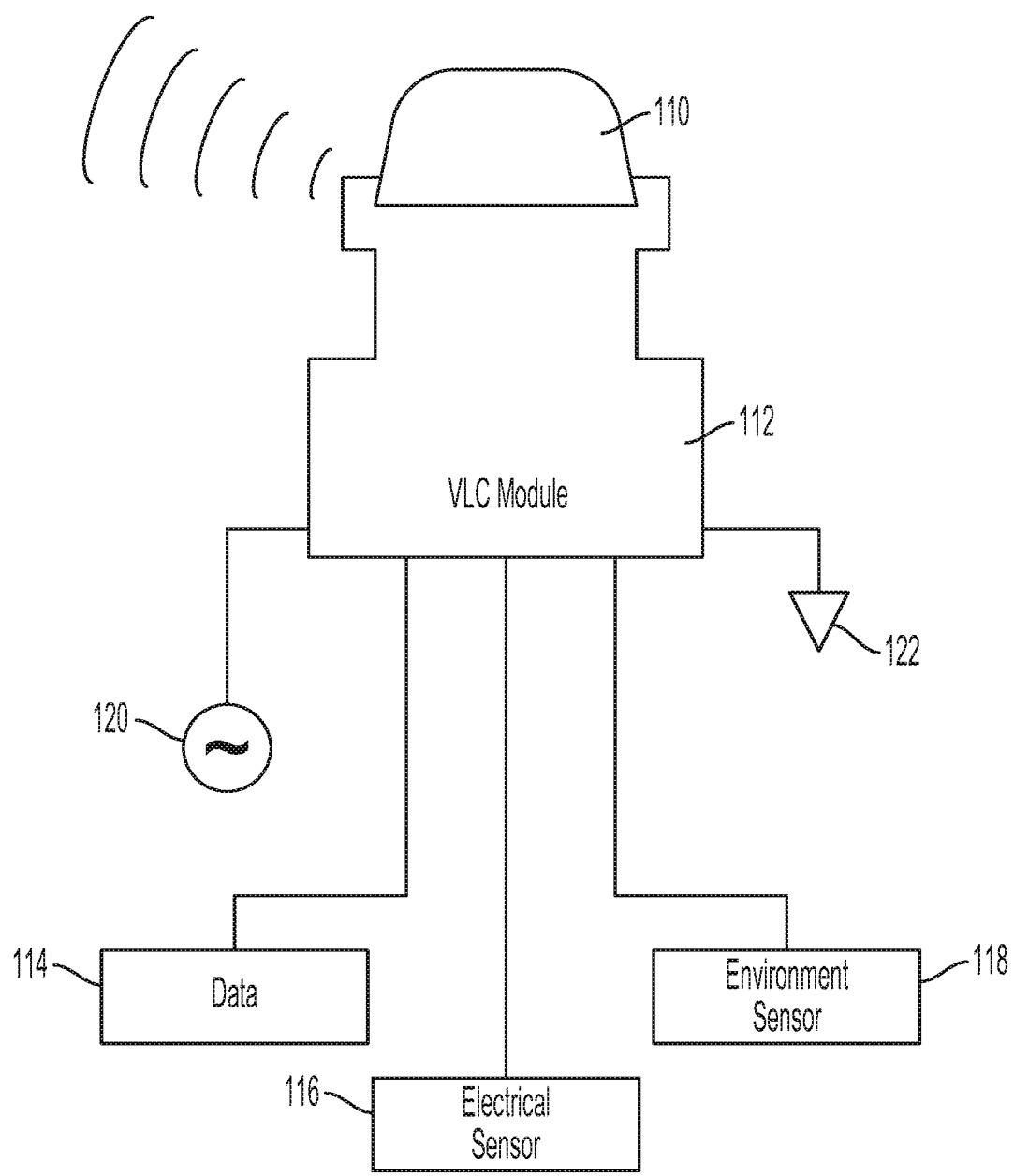
FIG. 2 depicts a simplified block diagram of an electrical enclosure, according to an example implementation.

FIG. 2 depicts a simplified block diagram of the electrical enclosure 100, according to an example implementation. In particular, FIG. 2 shows the pilot light 110, a communication module 112, a data module 114, an electrical sensor 116, an environment sensor 118, a power input 120 and a ground 122.

The pilot light 110 can be, for example, a light-emitting diode (LED) or another light source that is controllable to provide a visible communication signal. The communication module 112 may be configured for VLC communications and may cause the pilot light 110 to emit visible communication signals, perhaps based on context or in accordance with external instructions, such as those received from a client device (e.g., the client device 140) or a controller (e.g., the controller 150). Within examples, such contexts can include a normal operating context in which identification data of the electrical enclosure 100 and components thereof, along with indications of predetermined operational aspects are repeatedly communicated. The contexts can further include a maintenance context in which indications of a history (e.g., representing a predetermined time period, such as a day, week, or month) of predetermined operational aspects of the electrical enclosure 100 and components thereof are communicated. The contexts can further include a targeted maintenance context in which indications pertaining to a particular operational parameter or component are communicated. The contexts can further include a collective maintenance context in which visual communication signals are provided in response to detecting that another electrical enclosure has completed its communication or based on detecting a proximity of a client device. This can occur in a scheduled maintenance scenario, such as that described below with respect to FIG. 3 below.

The communication module 112 and the pilot light module 110 may be collectively referred to as a pilot light module. The communication module 112 may be connected and/or coupled to a identification data module (e.g., the data module 114), the electrical sensor 116, and the environment sensor 118. The communication module may be configured to determine a visual communication signal based on information received from one or more of the identification data module, the electrical sensor 116, and the environment sensor 118, and to drive the visual communication signal via the pilot light 110. The visual communication signal indicates one or more operational parameters within the electrical enclosure, such as those sensed by the electrical sensor 116 and the environment sensor 118.

The data module 114 may include a data storage device, and may serve as an identification data module of the electrical enclosure 100. For instance, the data module 114 may include representations of an identification number of the electrical enclosure 100, identification numbers and/or component type information for components within the electrical enclosure 100, or component details such as voltage, current, or power ratings associated with each component. The data module 114 may also store historical data of the electrical enclosure 100 and components thereof, such as representations of values of each tracked parameter and component in the electrical enclosure 100.

The data module 114 may include computer-readable storage media that is accessible and executable by one or more processors. The memory can include volatile and/or non-volatile storage components, such as optical, magnetic, organic or other memory or disc storage, which can be integrated in whole or in part with the processors. The memory is considered non-transitory computer readable media. For example, one or more additional modules of the electrical enclosure 100, a client device, or a controller, may access the data module 114. Within examples, the data module 114 may include a removable memory that can be inserted and extracted from the electrical enclosure 100 without opening the electrical enclosure 100. In this manner, historical data can be transferred manually when necessary without interrupting other operations of the electrical enclosure 100.

The electrical sensor 116 may be configured to determine one or more of a voltage, a current, and an ON/OFF status of one or more electrical components within the electrical enclosure. Other information may be obtained as well. For example, the electrical sensor, may determine overall voltage, current, and power usage of the electrical enclosure 100. For instance, this information may be determined based on an internal resistance of the electrical enclosure 100 and components thereof aspects of a power signal received from the power source 120, and the ground 122.

The environment sensor 118 (otherwise referred to herein as an enclosure environment sensor) may detect one or more environmental characteristics within the electrical enclosure 100. For example, the environment sensor 118 determine one or more of a temperature, a humidity level, and a water ingress within an inner portion of the electrical enclosure 100, and may include one or more of a temperature sensor, humidity sensor, and a water sensor configured for detecting these characteristics in an inner portion of the electrical enclosure 100. An inner portion of the enclosure 100 can be a cavity within the housing 102 of the enclosure 102. Temperature, humidity, and water ingress each can affect the lifespan or performance of various electrical components. Accordingly, determining these values may allow for preventative maintenance of the electrical enclosure 100 or the surrounding environment in order to preserve effective use of components in the electrical enclosure 100.

Within examples, the communication module 112, the data module 114, the electrical sensor 116, and the environment sensor 118 may be part of a unitary device or discrete devices. These parts of the electrical enclosure may be implemented using logical circuitry, stand-alone components, and may take the form of one or more computing devices. The one or more computing devices may include one or more processors, a memory, and instructions. The one or more processors may be general-purpose processors or special purpose processors corresponding to detecting operational parameters of the electrical enclosure 100 and for driving visual communication signals. The one or more processors can be configured to execute the instructions (e.g., computer-readable program instructions) that are stored in the memory and are executable to provide the functionality of the electrical enclosure 100 or systems thereof.

The memory includes computer-readable storage media that is accessible and executable by the one or more processors. The memory can include volatile and/or non-volatile storage components, such as optical, magnetic, organic or other memory or disc storage, which can be integrated in whole or in part with the processors. The memory is considered non-transitory computer readable media. Instructions executable by the one or more processor are stored on the memory. The instructions include computer-executable code.

Figure 3:
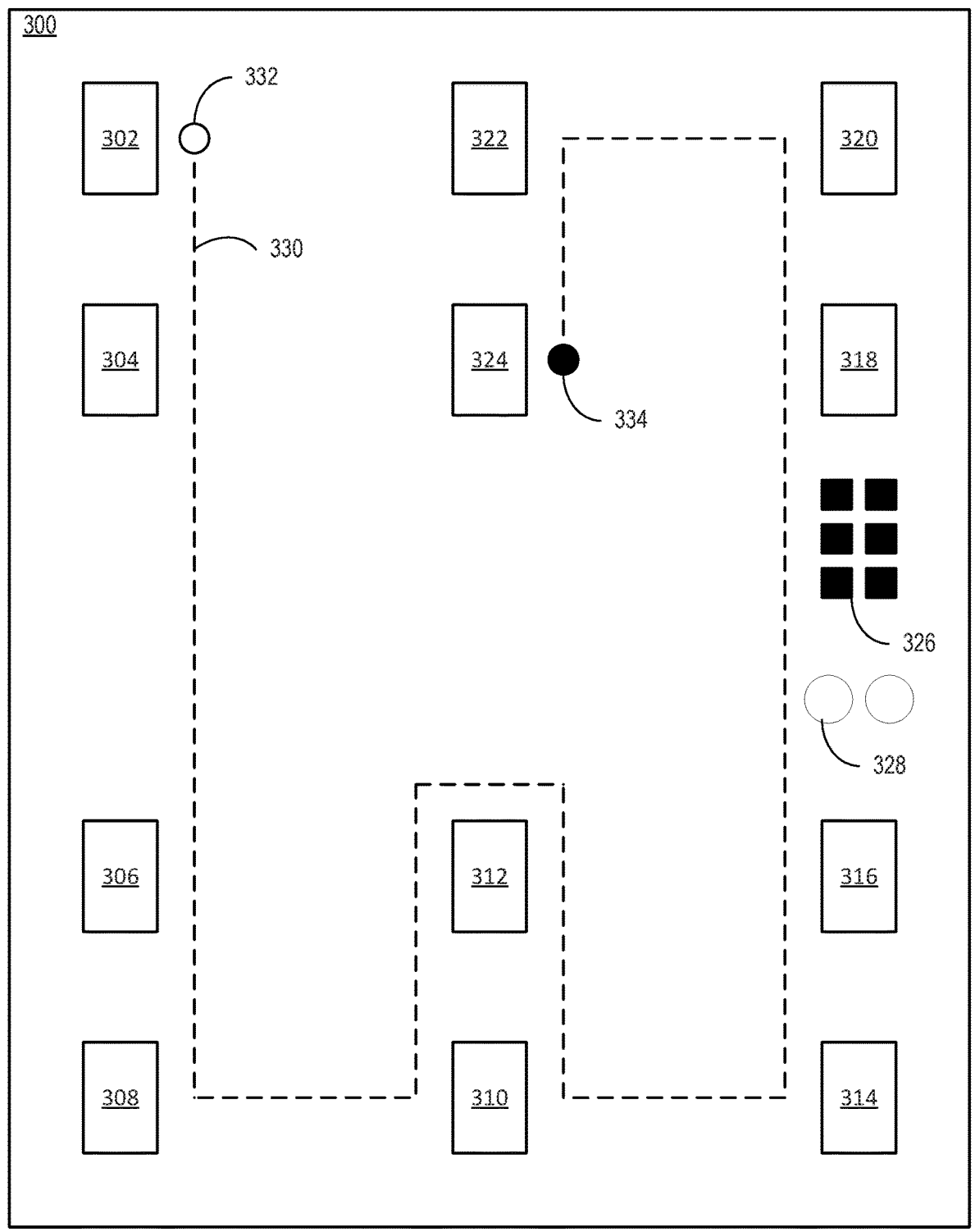
FIG. 3 depicts a simplified block diagram of a system including a plurality of electrical enclosures, according to an example implementation.

FIG. 3 depicts a simplified block diagram of a system 300 including a plurality of electrical enclosures, according to an example implementation. In particular, FIG. 3 depicts a maintenance scenario involving a plurality of electrical enclosures within a common environment. The common environment can be a facility, such as a power-generation facility, a warehouse, a factory, or the like. In the present example, the system 300 includes electrical enclosures 302, 304, 306, 308, 310, 312, 314, 316, 318, 320, 322, and 324. These electrical enclosures may also house a plurality of electrical components that correspond to systems, machinery, or devices in the common environment. The system 300 further includes a central controller 326 and a database 328 that can be used to facilitate maintenance and supervision of these electrical components using the electrical enclosures, and more particularly, visual communication signals from the electrical enclosures. The central controller 326 may be the same or similar to the controller 150 described above with respect to FIG. 1. The database 326 may more generally be a data store, and within examples can be contained within the central controller 326. Within examples, the central controller 326 may be a server or server bank, or a portion thereof.

In the depicted scenario, the central controller 326 dictates a maintenance schedule of the common environment in which the electrical enclosures are reviewed in a predetermined order. For example, as depicted, a maintenance path 330 starting at point 332 and ending at point 334 corresponds to inspecting the electrical enclosure 302 first, the electrical enclosure 304 second, and so on until reaching the electrical enclosure 324. A user may use a client device, such as the client device 140, past each of these electrical enclosures in turn, and use visual communication processing capabilities of the client device to facilitate determining whether maintenance of the electrical enclosures is needed.

As an example, a visual communication signal from the electrical enclosure 302 may include operational parameters corresponding to heat, humidity, and water ingress within the electrical enclosure 302, indications of which components are within the electrical enclosure (such as identification information and/or current/voltage/power ratings of each given component), and operational characteristics for each component. In some examples, identification information for the electrical enclosure 302 or for components thereof may be transmitted to the central controller 326, a relevant thresholds and ratings may be retrieved from the database, upon which the client device or the central controller 326 may make a maintenance decision. For example, the client device may automatically determine whether immediate action should be taken, such as flipping a control switch of the electrical enclosure 302, or whether the electrical enclosure 302 should be scheduled for maintenance (e.g., to remove water within the electrical enclosure 302 and to fix any causes for the water ingress). The maintenance schedule may call for similar evaluation of each electrical enclosure in the common environment. Some particular implementations if this are now described.

Within examples, the electrical enclosures may include a wireless interface, and the pilot light module is configured to receive a request for a set of operational parameters by way of the wireless interface. For example, this request may come from a client device or the central controller 326. In this context, driving the visual communication signal via the pilot light include driving the visual communication signal via the pilot light responsive to receiving the request for the set of operational parameters. For example, in these examples, the electrical enclosure may only send information corresponding to the requested set of parameters.

Within further examples, the central controller 326 may receive indications of values for one or more parameters of one or more electrical components within the electrical enclosures. For example, this may occur wirelessly or over a wired connection such as via CAN communication. Within CAN implementations, the central controller 326 may serve as a CAN controller and each of the electrical enclosures may serve as CAN nodes. The central controller 326 is further configured to, based on the received indications of the values for the one or more parameters, provide an instruction to inspect the one or more electrical components within the electrical enclosure. The resulting visual communication signal may include an indication of which electrical component is to be inspected. This may allow the electrical enclosures to alert a user following the maintenance path 330 to determine that a particular component should be inspected.

Within examples, the central controller 326 may receive indications of overall voltage, current, power-consumption, or the like for the electrical enclosure 306, and may determine that one or more of the components (e.g., a given component with a relatively low current rating) should be inspected based on, for example, the overall value exceeding a threshold. For example, the threshold may be associated with a total rating of the components within the electrical enclosure 306 (e.g., this can be determined by adding maximum ratings, such as current ratings, for each of the components). Otherwise, the central controller 326 may use data from the database 328 to train a machine learning model for detecting maintenance scenarios of the electrical enclosures, and may input data from the electrical enclosures into the trained model to provide suggested maintenance actions.

Within examples, the client device is configured to transmit a request beacon, wherein the request beacon prompts the communication module to drive the visual communication signal via the pilot light. For example, in a maintenance context (e.g., during the scheduled maintenance in the example scenario of FIG. 3) each electrical enclosure may transmit visual communication signals only upon prompting by the client device. For example, a user may use the client device to send a beacon corresponding to each particular electrical enclosure while following the maintenance path 330. In other examples the client device may do this automatically by detecting an identifier of each electrical enclosure (e.g., a QR code on the housing each electrical enclosure) and responsively transmitting the beacon. In other examples, the beacon may indicate that a client device is nearby, and the electrical enclosures may transmit visual communication signals based on a determined signal strength of the beacon. Further example implementations are described below with respect to FIG. 4.

Figure 4:
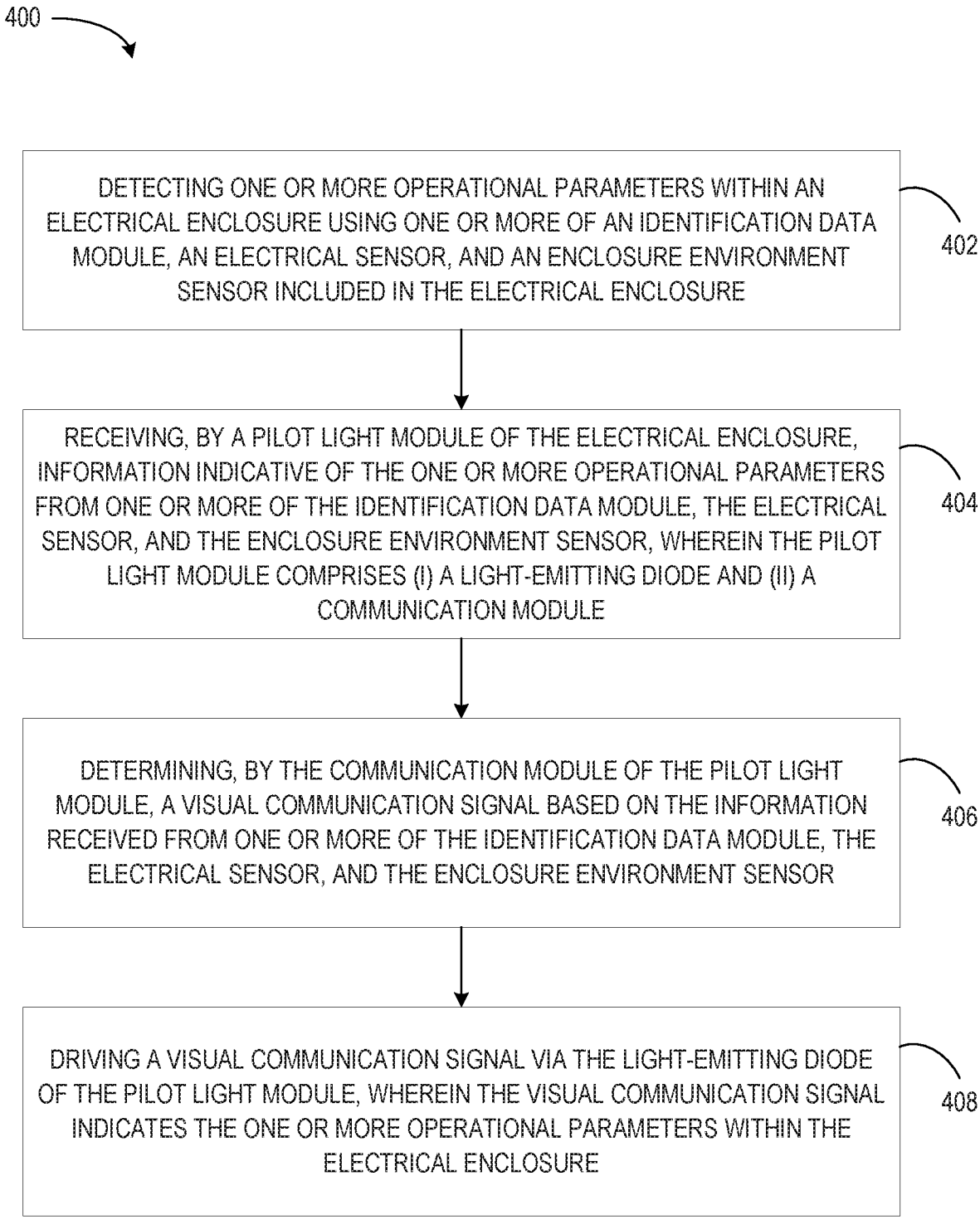
FIG. 4 depicts a flowchart of a method, according to an example implementation.

FIG. 4 depicts a flowchart of a method 400, according to an example implementation. Method 400 shown in FIG. 4 presents an example of a method that could be used with the electrical enclosure 100 and the system 300 described herein with respect to FIGS. 1, 2, and 3, with components thereof. Further, devices or systems may be used or configured to perform logical functions presented in FIG. 4. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

For this and other processes and methods disclosed herein, flowcharts show functionality and operation of one possible implementation of present examples. Each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 4, and within other processes and methods disclosed herein, may represent circuitry that is wired to perform the specific logical functions in the process. For example, an MCU, special-purpose processor, analog control circuitry, or the like can be used to carry out the blocks described in relation to method 400. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402 the method 400 includes detecting one or more operational parameters within an electrical enclosure (e.g., the electrical enclosure 100) using one or more of an identification data module (e.g., the data module 114), an electrical sensor (e.g., the electrical sensor 116), and an enclosure environment sensor (e.g., the environment sensor 118) included in the electrical enclosure. For example, detecting the one or more operational parameters within the electrical enclosure may include determining one or more of a voltage, a current, and an ON/OFF status of one or more electrical components within the electrical enclosure. Within further examples, detecting the one or more operational parameters within the electrical enclosure comprises determining one or more of a temperature, a humidity level, and a water ingress within an inner portion of the electrical enclosure. This may be carried out as described above with respect to FIGS. 1, 2, and 3.

At block 404, the method 400 includes receiving, by a pilot light module of the electrical enclosure, information indicative of the one or more operational parameters from one or more of the identification data module, the electrical sensor, and the enclosure environment sensor, wherein the pilot light module comprises (i) a pilot light (e.g., the pilot light 110) and (ii) a communication module (e.g., the communication module 112). This may be carried out as described above with respect to FIGS. 1, 2, and 3.

At block 406, the method 400 includes determining, by the communication module of the pilot light module, a visual communication signal based on the information received from one or more of the identification data module, the electrical sensor, and the enclosure environment sensor. This may be carried out as described above with respect to FIGS. 1, 2, and 3.

At block 408, the method 400 includes driving a visual communication signal via the pilot light of the pilot light module. The visual communication signal indicates the one or more operational parameters within the electrical enclosure. This may be carried out as described above with respect to FIGS. 1, 2, and 3.

Within examples, the method 400 further includes receiving a request for a set of operational parameters. In these examples, driving the visual communication signal via the pilot light includes driving the visual communication signal via the pilot light responsive to receiving the request for the set of operational parameters, and wherein the one or more operational parameters within the electrical enclosure include at least the set of operational parameters. This may be carried out as described above with respect to FIGS. 1, 2, and 3.

Within examples, the method 400 further includes detecting that a client device is less than a threshold distance from the electrical enclosure, wherein driving the visual communication signal comprises driving the visual communication signal responsive to detecting that the client device is less than the threshold distance from the electrical enclosure. For example, the threshold distance may be 5 meters. Detecting that the client device is less than a threshold distance from the electrical enclosure may be performed by the electrical enclosure or the client device. For example, the client device may visually determine a proximity between the client device and the electrical enclosure (e.g., based on a relative size of a visual identifier, such as a QR code), and responsively request the visual communication signal from the electrical enclosure. Within other examples, the electrical enclosure may determine the proximity based on determining a wireless signal strength of the client device. For example, the signal strength may be determined receiving a request from the client device via a wireless interface of the electrical enclosure.

Within examples, the method 400 further includes receiving a request beacon from a client device. In these examples, the request beacon prompts the communication module of the pilot light module to drive the visual communication signal via the pilot light. This may be carried out as described above with respect to FIG. 3.

Within examples, the method 400 further includes determining a type of client device for receiving the visual communication signal. For example the client device may send a beacon signal that includes an identification number of the client device, and the identification number may be associated with a particular class of client device. Within these examples, selecting the one or more operational parameters for detection is based on determining the type of client device. For example, some client devices may be associated with particular electrical enclosures, components thereof, or particular parameters, and the electrical enclosure may select parameters for the visual communication signal accordingly.

Within examples, the electrical enclosure is a first electrical enclosure of a plurality of electrical enclosures. In such examples, the method 400 further includes receiving, from a central controller of the plurality of electrical enclosures, an instruction to enter a maintenance mode. For examples, this may be carried out according to a maintenance schedule, such as that described above with respect to FIG. 3. Within these examples, responsive to receiving the instruction, the method 400 includes determining that a second electrical enclosure is driving a second visual communication signal. For example, the electrical enclosure 304 may determine that the electrical enclosure 302 is driving the visual communication signal based on receiving a signal from the electrical enclosure 302, the client device, or the central controller 326. Within these examples, the method 400 further includes driving the visual communication signal based on determining that the second electrical enclosure is driving the second visual communication signal. For example, the electrical enclosure 304 may drive the visual communication signal according to predetermined delay (e.g., 10 seconds) after detecting that the electrical enclosure 302 has started driving the second visual communication signal.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
    an electrical enclosure comprising:
        an identification data module;
        an electrical sensor;
        an enclosure environment sensor;
        a wireless interface; and
        a pilot light module comprising (i) a pilot light and (ii) a communication module, wherein the communication module is coupled to the identification data module, the electrical sensor, and the enclosure environment sensor, wherein the communication module is configured to:
            determine a visual communication signal based on information received from one or more of the identification data module, the electrical sensor, and the enclosure environment sensor, and
            drive the visual communication signal via the pilot light, wherein the visual communication signal indicates one or more operational parameters within the electrical enclosure, wherein the pilot light module is configured to receive a request for a set of operational parameters by way of the wireless interface, wherein driving the visual communication signal via the pilot light comprises driving the visual communication signal via the pilot light responsive to receiving the request for the set of operational parameters, and wherein the one or more operational parameters within the electrical enclosure comprise at least the set of operational parameters; and
    a client device configured to receive the visual communication from the pilot light.

2. The system of claim 1, wherein the identification data module stores information indicative of at least (i) an identification of the electrical enclosure, and (ii) a representation of one or more electrical components within the electrical enclosure.

3. The system of claim 1, wherein the electrical sensor is configured to determine one or more of a voltage, a current, and an ON/OFF status of one or more electrical components within the electrical enclosure.

4. The system of claim 1, wherein the enclosure environment sensor is configured to determine one or more of a temperature, a humidity level, and a water ingress within an inner portion of the electrical enclosure.

5. The system of claim 1, further comprising a plurality of switches attached to an outer portion of the electrical enclosure, wherein each of the switches controls a different electrical component within the electrical enclosure.

6. The system of claim 1, further comprising a central controller configured to receive indications of values for one or more parameters of one or more electrical components within the electrical enclosure, wherein the central controller is further configured to, based on the received indications of the values for the one or more parameters, provide an instruction to inspect the one or more electrical components within the electrical enclosure.

7. The system of claim 6, wherein the visual communication signal comprises an indication of which electrical component of the one or more electrical components is to be inspected.

8. The system of claim 1, wherein the electrical enclosure is a first electrical enclosure of a plurality of electrical enclosures in a common environment, the system further comprising a central controller, wherein the central controller is configured to control visual communication signals corresponding to each of the plurality of electrical enclosures.

9. The system of claim 1, wherein the electrical enclosure comprises an electrical power component of one or more of an electric motor, a compressor, a thermostat, a valve, a regulator, a gearbox, a light fixture, and a pump.

10. The system of claim 1, wherein the client device is configured to transmit a request beacon, wherein the request beacon prompts the communication module of the pilot light module to drive the visual communication signal via the pilot light.

11. A method comprising:
    detecting one or more operational parameters within a first electrical enclosure of a plurality of electrical enclosures using one or more of an identification data module, an electrical sensor, and an enclosure environment sensor included in the electrical enclosure;
    receiving, by a pilot light module of the first electrical enclosure, information indicative of the one or more operational parameters from one or more of the identification data module, the electrical sensor, and the enclosure environment sensor, wherein the pilot light module comprises (i) a pilot light and (ii) a communication module;
    determining, by the communication module of the pilot light module, a visual communication signal based on the information received from one or more of the identification data module, the electrical sensor, and the enclosure environment sensor;
    receiving, from a central controller of the plurality of electrical enclosures, an instruction to enter a maintenance mode;
    responsive to receiving the instruction, determining that a second electrical enclosure is driving a second visual communication signal; and
    driving the visual communication signal via the pilot light of the pilot light module based on determining that the second electrical enclosure is driving the second visual communication signal, wherein the visual communication signal indicates the one or more operational parameters within the electrical enclosure.

12. The method of claim 11, wherein detecting the one or more operational parameters within the electrical enclosure comprises determining one or more of a voltage, a current, and an ON/OFF status of one or more electrical components within the electrical enclosure.

13. The method of claim 11, wherein detecting the one or more operational parameters within the electrical enclosure comprises determining one or more of a temperature, a humidity level, and a water ingress within an inner portion of the electrical enclosure.

14. The method of claim 11, further comprising:
receiving a request for a set of operational parameters, wherein driving the visual communication signal via the pilot light comprises driving the visual communication signal via the pilot light responsive to receiving the request for the set of operational parameters, and wherein the one or more operational parameters within the electrical enclosure comprise at least the set of operational parameters.

15. The method of claim 11, further comprising:
detecting that a client device is less than a threshold distance from the electrical enclosure, wherein driving the visual communication signal comprises driving the visual communication signal responsive to detecting that the client device is less than the threshold distance from the electrical enclosure.

16. The method of claim 11, further comprising:
receiving a request beacon from a client device, wherein the request beacon prompts the communication module of the pilot light module to drive the visual communication signal via the pilot light.

17. The method of claim 11, further comprising:
determining a type of client device for receiving the visual communication signal; and
selecting the one or more operational parameters for detection based on determining the type of client device.

18. A non-transitory computer readable medium having stored thereon instructions, that when executed by one or more processors, perform functions comprising:
detecting one or more operational parameters within an electrical enclosure using one or more of an identification data module, an electrical sensor, and an enclosure environment sensor included in the electrical enclosure;
receiving, by a pilot light module of the electrical enclosure, information indicative of the one or more operational parameters from one or more of the identification data module, the electrical sensor, and the enclosure environment sensor, wherein the pilot light module comprises (i) a pilot light and (ii) a communication module;
determining, by the communication module of the pilot light module, a visual communication signal based on the information received from one or more of the identification data module, the electrical sensor, and the enclosure environment sensor; and
driving a visual communication signal via the pilot light of the pilot light module, wherein the visual communication signal indicates the one or more operational parameters within the electrical enclosure, wherein the visual communication signal causes a central controller to, based on the received indications of the values for the one or more parameters, provide an instruction to inspect the one or more electrical components within the electrical enclosure.

* * * * *